(12) United States Patent
Kuratani

(10) Patent No.: US 11,372,015 B2
(45) Date of Patent: Jun. 28, 2022

(54) SAMPLE INJECTOR

(71) Applicant: SHIMADZU CORPORATION, Kyoto (JP)

(72) Inventor: Yutaka Kuratani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 436 days.

(21) Appl. No.: 16/668,141

(22) Filed: Oct. 30, 2019

(65) Prior Publication Data

US 2020/0182896 A1 Jun. 11, 2020

(30) Foreign Application Priority Data

Dec. 6, 2018 (JP) .............................. JP2018-229314

(51) Int. Cl.
*G01N 35/10* (2006.01)
*G01N 35/00* (2006.01)

(52) U.S. Cl.
CPC ... *G01N 35/1016* (2013.01); *G01N 35/00732* (2013.01); *G01N 2035/00752* (2013.01); *G01N 2035/00801* (2013.01); *G01N 2035/00851* (2013.01)

(58) Field of Classification Search
None
See application file for complete search history.

(56) References Cited

U.S. PATENT DOCUMENTS

| 3,912,456 | A | * | 10/1975 | Young | .................... | H01L 21/00 436/47 |
| 5,651,775 | A | * | 7/1997 | Walker | .............. | A61M 5/31533 604/207 |
| 5,879,627 | A | | 3/1999 | Tanihata | | |
| 2012/0325026 | A1 | * | 12/2012 | Enrico | ............. | G01N 35/00732 73/864.73 |

FOREIGN PATENT DOCUMENTS

| JP | 10-293090 A | 11/1998 |
| JP | 3367319 B2 | 1/2003 |
| JP | 2004-298550 A | 10/2004 |

OTHER PUBLICATIONS

"GC Atutosampler Fit all GC and GC-MS", HT3200A: Premium Autosampler, HTA https://www.hta-it.com/products/ht3200a.html, 2 pages.

* cited by examiner

*Primary Examiner* — Benjamin R Schmitt
(74) *Attorney, Agent, or Firm* — Sughrue Mion, PLLC

(57) ABSTRACT

A sample injector is configured to determine an amount of movement of a piston for injecting a sample into an analyzer based on a preset amount of the sample to be injected into the analyzer and information of a first identification code about an internal volume read by an optical sensor.

8 Claims, 6 Drawing Sheets

FIG.1
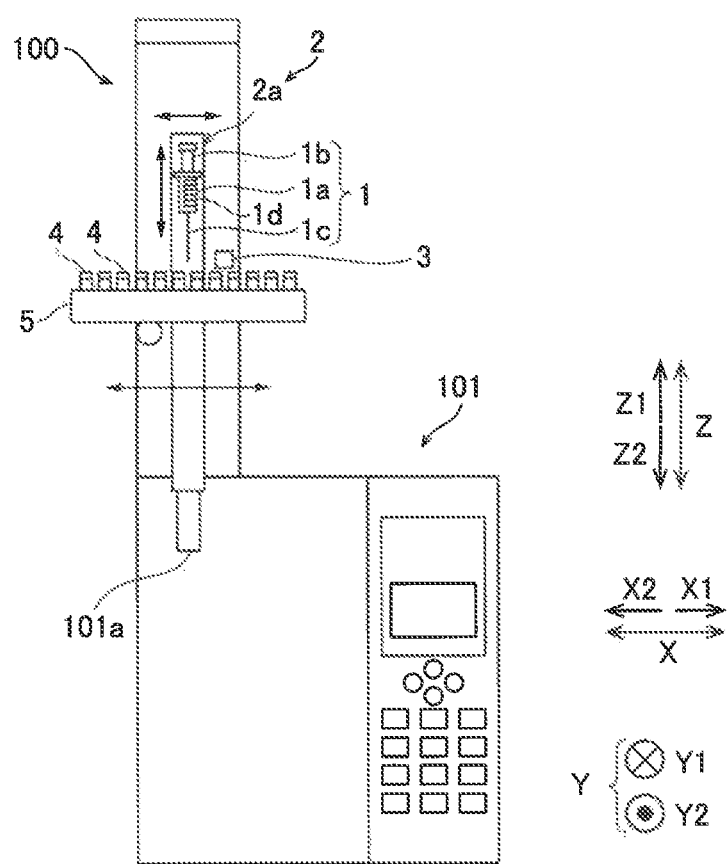
FIG.2A
FIRST EMBODIMENT
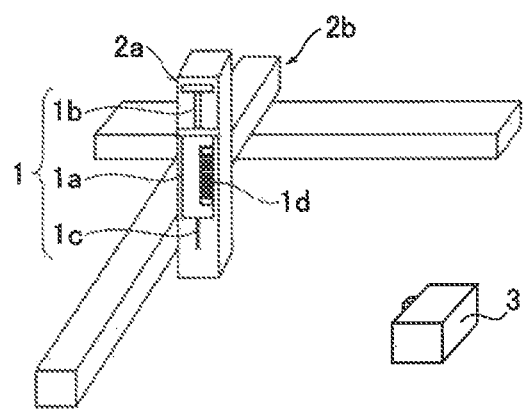
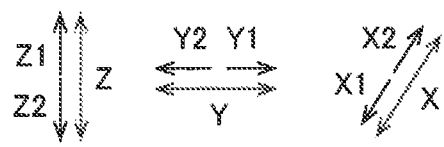
FIG.2B
FIRST EMBODIMENT
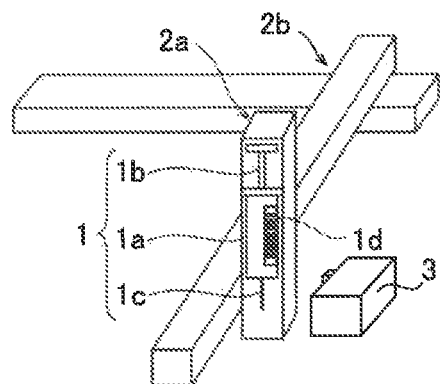
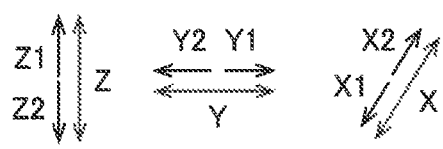

FIRST EMBODIMENT

FIRST EMBODIMENT

SECOND EMBODIMENT

SECOND EMBODIMENT

*FIG.9*

SECOND EMBODIMENT

|  | VOLUME | SYRINGE MODEL NAME |
|---|---|---|
| SYRINGE A | 50 μl | AAAA |
| SYRINGE B | 10 μl | BBBB |
| ⋮ |  |  |
| SYRINGE X | 10 μl | XXXX |

*FIG.10*

SECOND EMBODIMENT

SAMPLE A ——— SYRINGE A

SAMPLE B ——— SYRINGE B

SAMPLE C ——— SYRINGE C

⋮

SAMPLE X ——— SYRINGE F

SAMPLE INJECTOR

CROSS-REFERENCE TO RELATED APPLICATIONS

This application claims the benefit of priority to Japanese Patent Application No. 2018-229314 filed on Dec. 6, 2018. The entire contents of this application are hereby incorporated herein by reference.

BACKGROUND OF THE INVENTION

Field of the Invention

The present invention relates to a sample injector, and more particularly, it relates to a sample injector configured to inject an amount of sample corresponding to the amount of movement of a piston from a syringe into an analyzer.

Description of the Background Art

Conventionally, a sample injector configured to inject an amount of sample corresponding to the amount of movement of a piston from a syringe to an analyzer is known. Such a sample injector is disclosed in Japanese Patent Laid-Open No. 10-293090, for example.

In a sample injector disclosed in Japanese Patent Laid-Open No. 10-293090, a microsyringe is moved up and down by a stepping motor. The microsyringe is moved down and a plunger of the sample injector is pushed down (moved downward) in a state in which a needle attached to the microsyringe penetrates into a rubber plug of a sample introduction unit of a gas chromatograph such that a sample in the microsyringe of the sample injector is injected into the sample introduction unit (gas chromatograph). At this time, an amount of the sample to be discharged from the microsyringe is changed in accordance with the amount of movement of the plunger.

Although not disclosed in Japanese Patent Laid-Open No. 10-293090, in a conventional sample injector as disclosed in Japanese Patent Laid-Open No. 10-293090, the amount of movement of a plunger may be calculated based on the amount of sample to be injected set by a user and the internal volume of a microsyringe. In addition, although not disclosed in Japanese Patent Laid-Open No. 10-293090, in the conventional sample injector as disclosed in Japanese Patent Laid-Open No. 10-293090, the microsyringe may be replaced with a microsyringe having a different internal volume as needed. When the user incorrectly sets the internal volume of the microsyringe at the time of replacing the microsyringe (or when the user forgets to change settings), for example, the amount of movement of the plunger is determined based on the internal volume of the microsyringe incorrectly set by the user, and thus the amount of sample actually injected is disadvantageously different from the set amount of sample to be injected. In such a case, analysis by a gas chromatograph becomes inadequate.

SUMMARY OF THE INVENTION

The present invention is intended to solve the above problem. The present invention aims to provide an automatic sample injector capable of significantly reducing or preventing inadequate sample analysis by an analyzer due to injection of an inappropriate amount of sample.

In order to attain the aforementioned object, a sample injector according to an aspect of the present invention includes a syringe movement mechanism configured to move a syringe that contains a sample, the syringe being attached with a first identification code that indicates information about its own internal volume, and a piston that reciprocates within the syringe toward an analyzer configured to analyze the sample, and an optical sensor configured to read the first identification code attached to the syringe installed in the syringe movement mechanism. Furthermore, the sample injector is configured to determine an amount of movement of the piston for injecting the sample from the syringe into the analyzer based on a preset amount of the sample to be injected into the analyzer and the information of the first identification code about the internal volume read by the optical sensor.

As described above, the sample injector according to this aspect of the present invention is configured to determine the amount of movement of the piston based on the preset amount of the sample to be injected into the analyzer and the information of the first identification code about the internal volume read by the optical sensor such that unlike the case in which a user manually sets the internal volume of the syringe, the user does not make incorrect settings or forget to make settings, and thus it is possible to significantly reduce or prevent determination of the amount of movement of the piston based on the incorrectly set internal volume of the syringe. Consequently, it is possible to significantly reduce or prevent a difference between the preset amount of the sample to be injected into the analyzer and the amount of the sample actually injected from the syringe. Thus, it is possible to significantly reduce or prevent inadequate sample analysis by the analyzer due to injection of an inappropriate amount of the sample.

Furthermore, the first identification code attached to the syringe installed in the syringe movement mechanism is read such that as compared with the case in which the first identification code is read and then the syringe is installed in the syringe movement mechanism, it is possible to significantly reduce or prevent an artificial mistake of installing a syringe different from the syringe, the first identification code of which is read, in the syringe movement mechanism.

In addition, the first identification code is read directly by the optical sensor, and thus as compared with a radio frequency identifier (RFID) that reads information of an identification tag by radio waves, for example, it is possible to significantly reduce or prevent erroneous reading of another identification code when reading the first identification code. Moreover, the configuration of the sample injector can be relatively simplified as compared with the RFID.

In the aforementioned sample injector according to this aspect, the optical sensor is preferably configured to detect whether or not a vial container that stores the sample to be suctioned into the syringe is disposed at a predetermined position, and to read the first identification code attached to the syringe. According to this configuration, unlike the case in which an optical sensor configured to detect whether or not the vial container is disposed at the predetermined position and an optical sensor configured to read the first identification code attached to the syringe are separately provided, it is possible to significantly reduce or prevent an increase in the number of components.

In this case, the optical sensor preferably includes a reflective sensor configured to read the first identification code, and to detect whether or not the vial container is disposed at the predetermined position. The reflective sensor has a simpler configuration as compared with a barcode reader or the like installed in a store or the like. Therefore, the optical sensor includes the reflective sensor such that the configuration of the sample injector can be simplified.

In the aforementioned sample injector in which the optical sensor is configured to detect whether or not the vial container is disposed at the predetermined position and to read the first identification code, the optical sensor is preferably configured to read a second identification code attached to the vial container, the second identification code indicating information about at least a type of the sample stored in the vial container, when the vial container is disposed at the predetermined position, in addition to reading the first identification code and detecting whether or not the vial container is disposed at the predetermined position. According to this configuration, unlike the case in which the type of the sample stored in the vial container is manually set, it is possible to significantly reduce or prevent incorrect setting of the type of the sample. Consequently, it is possible to further significantly reduce or prevent inadequate sample analysis by the analyzer.

In this case, the sample injector preferably further includes a storage configured to store information about the sample of the vial container suctioned into the syringe and information about the syringe in association with each other based on the first identification code and the second identification code read by the optical sensor. According to this configuration, as compared with the case in which the amount and type of the sample to be injected into the analyzer are manually associated with each other and stored, it is possible to significantly reduce or prevent storing of the amount and type of the sample incorrectly associated with each other. Furthermore, the information about the sample of the vial container and the information about the syringe are stored in association with each other such that it is possible to more easily trace (analyze) the results of analysis of the analyzer.

The aforementioned sample injector in which the optical sensor is configured to read the second identification code preferably further includes a vial container movement mechanism configured to horizontally move the vial container, and the optical sensor is preferably fixed in a vicinity of the predetermined position, and is preferably configured to read the first identification code when the syringe is moved to a vicinity of the optical sensor by the syringe movement mechanism, and to read the second identification code when the vial container is moved to the predetermined position in the vicinity of the optical sensor by the vial container movement mechanism. According to this configuration, the first identification code and the second identification code can be read by the optical sensor without moving the optical sensor.

In the aforementioned sample injector according to this aspect, the syringe movement mechanism preferably includes an upward-downward movement mechanism configured to move the syringe and the piston in an upward-downward direction to inject the sample contained in the syringe into the analyzer, and the optical sensor is preferably fixed between positions of the syringe and the piston before movement by the upward-downward movement mechanism and the analyzer, as viewed in a direction perpendicular to the upward-downward direction. According to this configuration, using the upward-downward movement mechanism configured to move the syringe and the piston in the upward-downward direction to inject the sample into the analyzer, the first identification code attached to the syringe being moved in the upward-downward direction by the upward-downward movement mechanism can be read by the optical sensor. Consequently, as compared with the case in which the syringe is moved by a dedicated movement mechanism different from the upward-downward movement mechanism in order for the optical sensor to read the first identification code, an increase in the number of components can be significantly reduced or prevented while the device configuration can be simplified.

In the aforementioned sample injector according to this aspect, the first identification code preferably further includes information about a tip shape of a needle attached to the syringe. According to this configuration, unlike the case in which the information about the needle tip shape is manually set, it is possible to significantly reduce or prevent incorrect setting of the information about the needle tip shape.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing the configuration of an auto-injector and a gas chromatographic apparatus according to a first embodiment.

FIG. 2A and FIG. 2B are diagrams illustrating the configuration of a horizontal movement mechanism of the auto-injector according to the first embodiment (FIG. 2A is a diagram showing the auto-injector before movement, and FIG. 2B is a diagram showing the auto-injector after movement).

FIG. 9 is a diagram showing information for each type of syringe stored in advance in the storage according to the second embodiment.

FIG. 10 is a diagram showing information obtained by associating information about a syringe with information about a sample according to the second embodiment.

DESCRIPTION OF THE PREFERRED EMBODIMENTS

Figure 3:
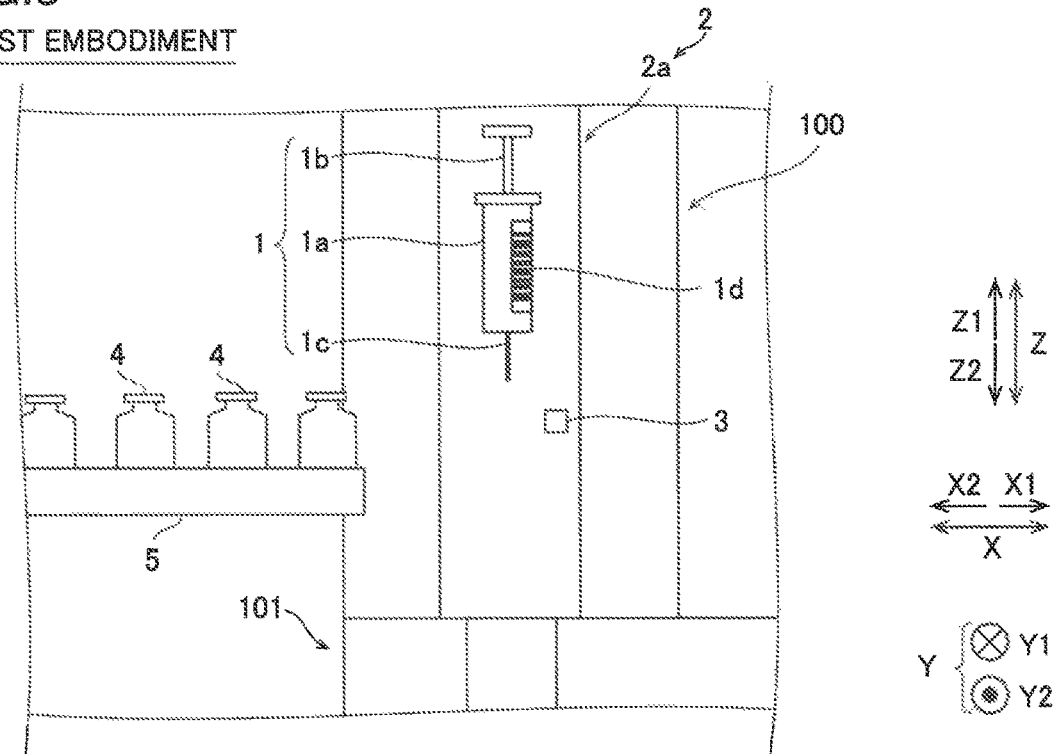
FIG. 3 is a diagram showing the auto-injector before movement by an upward-downward movement mechanism according to first embodiment.
Figure 4:
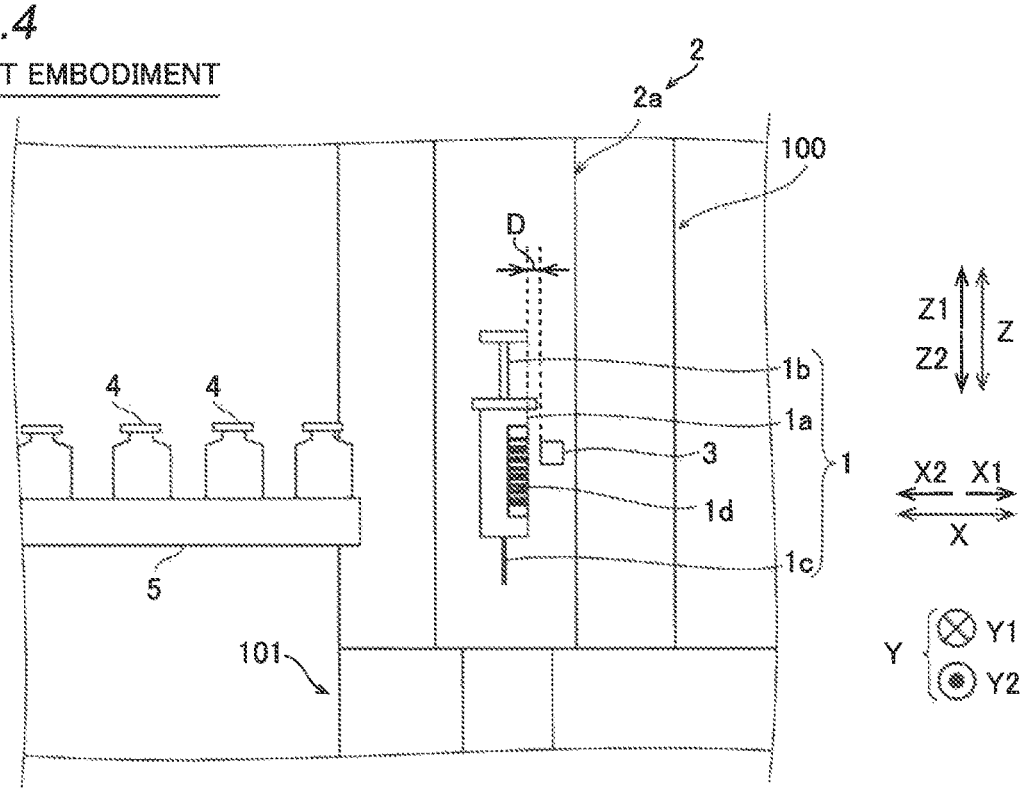
FIG. 4 is a diagram showing the auto-injector in a state in which a barcode is read by a reflective sensor according to the first embodiment.

Embodiments of the present invention are hereinafter described with reference to the drawings.

First Embodiment

The configuration of an auto-injector 100 according to a first embodiment is now described with reference to FIGS. 1 to 6. The auto-injector 100 is an example of a "sample injector" in the claims.

(Configuration of Auto-Injector)

As shown in FIG. 1, the auto-injector 100 includes a movement mechanism 2 configured to move a sample suction and discharge unit 1. The movement mechanism 2 includes an upward-downward movement mechanism 2a configured to move the sample suction and discharge unit 1 (a syringe 1a and a plunger 1b described below) toward a gas chromatographic apparatus 101 (Z2 direction side) configured to analyze a sample. In the gas chromatographic apparatus 101, a hydrogen flame ionization detector (FID), a flame photometric detector (FPD), a mass spectrometer (MS), or the like is used as a detector. The gas chromatographic apparatus 101 is an example of an "analyzer" in the claims.

The upward-downward movement mechanism 2a is configured to move the sample suction and discharge unit 1 (the syringe 1a and the plunger 1b described below) in an upward-downward direction in order to inject a sample contained in the syringe 1a described below into the gas chromatographic apparatus 101. The upward-downward movement mechanism 2a is an example of a "syringe movement mechanism" in the claims.

The movement mechanism 2 includes a horizontal movement mechanism 2b (see FIGS. 2A and 2B) configured to move the sample suction and discharge unit 1 (the syringe 1a and the plunger 1b described below) in a horizontal direction (an X direction and a Y direction). The horizontal movement mechanism 2b is configured to move the sample suction and discharge unit 1 in order to dispose the sample suction and discharge unit 1 on the Z1 direction side of a plurality of sample inlets 101a provided in the gas chromatographic apparatus 101. Although only one sample inlet 101a is provided in FIG. 1, a plurality of (three, for example) sample inlets are actually provided.

The sample suction and discharge unit 1 is configured to suction or discharge a liquid sample. Specifically, the sample suction and discharge unit 1 includes the syringe 1a that contains the sample. The sample suction and discharge unit 1 also includes the plunger 1b configured to be capable of reciprocating (moving) within the syringe 1a (in a Z1 direction and a Z2 direction). The sample suction and discharge unit 1 also includes a needle 1c attached to the syringe 1a. The plunger 1b is an example of a "piston" in the claims.

The auto-injector 100 includes a plunger movement mechanism (not shown) configured to move the plunger 1b of the sample suction and discharge unit 1. When the plunger 1b is moved in the Z2 direction (by the plunger movement mechanism), the sample in the syringe 1a is discharged to the outside through the needle 1c. When the plunger 1b is moved in the Z1 direction by the plunger movement mechanism while the tip of the needle 1c is immersed in the sample, the sample is suctioned into the syringe 1a through the needle 1c.

The syringe 1a is attached with a barcode 1d that indicates information about its own internal volume. Furthermore, the barcode 1d includes information about the tip shape of the needle 1c.

The auto-injector 100 includes a reflective sensor 3 configured to read the barcode 1d attached to the syringe 1a installed in the upward-downward movement mechanism 2a. The operation of reading the barcode 1d by the reflective sensor 3 is performed in a barcode reading mode immediately after the auto-injector 100 is activated. The reflective sensor 3 is an example of an "optical sensor" in the claims.

The reflective sensor 3 detects the amount (analog value) of light reflected from black portions of the barcode 1d and the amount of light reflected from white portions of the barcode 1d to detect the shape of the barcode 1d based on the waveform of the detected amounts of light. When the reflective sensor 3 is used, the barcode 1d is read (scanned) while the barcode 1d is moved with respect to the reflective sensor 3. On the other hand, when a barcode reader is used, an actuator, a mirror, etc. inside the barcode reader are driven such that the barcode 1d is read (scanned).

In the first embodiment, the reflective sensor 3 is fixed between the positions (the positions shown in FIG. 3) of the syringe 1a and the plunger 1b before movement by the upward-downward movement mechanism 2a and the gas chromatographic apparatus 101, as viewed in a direction (the X direction or the Y direction) perpendicular to the upward-downward direction (Z direction). Specifically, the sample suction and discharge unit 1 is configured to pass near the reflective sensor 3 when moved downward (in the Z2 direction) by the upward-downward movement mechanism 2a in the barcode reading mode.

While the barcode 1d is being read by the reflective sensor 3, the sample suction and discharge unit 1 is moved downward at a speed of about several millimeters per second by the upward-downward movement mechanism 2a. When the sample suction and discharge unit 1 (syringe 1a) passes near the reflective sensor 3, a distance D (see FIG. 4) between the syringe 1a and the reflective sensor 3 is about several millimeters.

More specifically, in the barcode reading mode, the auto-injector 100 first moves the sample suction and discharge unit 1 (syringe 1a) to the vicinity (the position in an XY plane shown in FIG. 2B) of the reflective sensor 3 (in the XY plane) by the horizontal movement mechanism 2b. Next, the auto-injector 100 moves the sample suction and discharge unit 1 downward (Z2 direction side) (moves the sample suction and discharge unit 1 from the position in FIG. 3 to the position in FIG. 4) by the upward-downward movement mechanism 2a. Then, the barcode 1d is read by the reflective sensor 3 while the sample suction and discharge unit 1 is moving downward.

In the first embodiment, the auto-injector 100 is configured to determine the amount of movement of the plunger 1b for injecting the sample from the syringe 1a into the gas chromatographic apparatus 101 based on a preset amount of sample to be injected into the gas chromatographic apparatus 101 and information of the barcode 1d about the internal volume (of the syringe 1a) read by the reflective sensor 3. The diameter of the syringe 1a differs depending on the internal volume of the syringe 1a, and thus when the plunger 1b is moved by the same distance with respect to syringes 1a having different internal volumes, a larger amount of sample is discharged from the syringe 1a having a relatively large internal volume (large diameter). That is, in order to discharge the same amount of sample from the syringes 1a having different internal volumes, it is necessary to determine the amount of movement of the plunger 1b to be relatively small with respect to the syringe 1a having a relatively large internal volume (large diameter).

Specifically, after the sample suction and discharge unit 1 is installed in the auto-injector 100 (movement mechanism 2), the information about the internal volume of the syringe 1a of the sample suction and discharge unit 1 read by the reflective sensor 3 is automatically set in the auto-injector 100. Then, the amount of movement of the plunger 1b is determined based on the amount of sample to be injected into the gas chromatographic apparatus 101, which has been manually set in advance, and the information about the internal volume of the syringe 1a automatically set. In this case, it is possible to save a user the hassle of manually setting the information about the internal volume of the syringe 1a.

Figure 5:
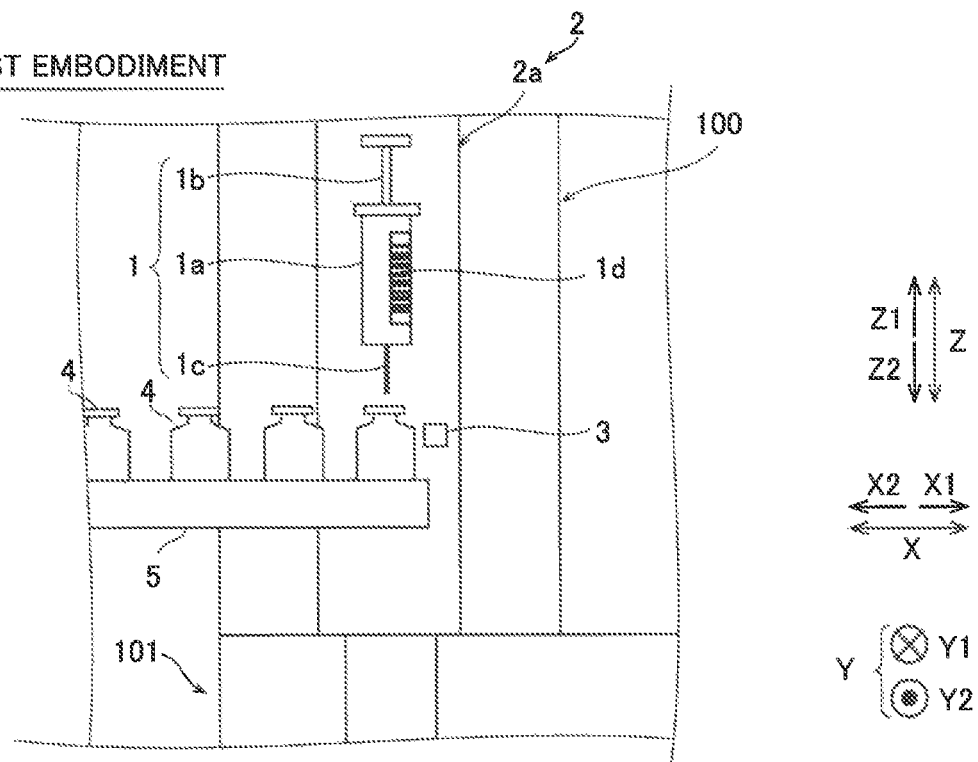
FIG. 5 is a diagram illustrating a state in which a vial container has been moved to a predetermined position in the vicinity of the reflective sensor according to the first embodiment.

As shown in FIG. 5, the auto-injector 100 includes a vial container carrier 5 configured to carry a plurality of vial containers 4 in which the sample to be suctioned by the syringe 1a is stored. The vial container carrier 5 is configured to move the plurality of vial containers 4 in the horizontal direction (X direction). The vial container carrier 5 moves the plurality of vial containers 4 in the horizontal direction (X direction) to place one of the plurality of vial containers 4 at a position overlapping the sample suction and discharge unit 1 as viewed from the Z1 direction side. Note that the position (hereinafter referred to as the predetermined position) overlapping the sample suction and discharge unit 1 as viewed from the Z1 direction side is located in the vicinity of the reflective sensor 3. The plurality of vial containers 4 are arranged along the X direction in the vial container carrier 5. The vial container carrier 5 is an example of a "vial container movement mechanism" in the claims. The position overlapping the sample suction and discharge unit 1 as viewed from the Z1 direction side is an example of a "predetermined position" in the claims.

In the first embodiment, the reflective sensor 3 is configured to detect whether or not the vial container 4 is disposed at the predetermined position in the vicinity of the reflective sensor 3, and to read the barcode 1d attached to the syringe 1a. Specifically, after the barcode 1d is read by the reflective sensor 3 in the barcode reading mode, the auto-injector 100 returns the sample suction and discharge unit 1 to the upper side (Z1 direction side) and moves the vial container carrier 5 (vial container 4) toward the reflective sensor 3 (X1 direction side). Then, the reflective sensor 3 detects whether or not one of the plurality of vial containers 4 to be measured is disposed at the predetermined position.

The auto-injector 100 is configured to move the sample suction and discharge unit 1 downward (toward the vial container 4) by the upward-downward movement mechanism 2a and suction the sample in the vial container 4 into the syringe 1a when the reflective sensor 3 detects that the vial container 4 has been carried to the predetermined position by the vial container carrier 5. The reflective sensor 3 detects light emitted from the reflective sensor 3 and reflected by the vial container 4 to detect whether or not the vial container 4 is disposed at the predetermined position.

The auto-injector 100 is configured to move the sample suction and discharge unit 1 toward the gas chromatographic apparatus 101 and inject the sample in the syringe 1a into the gas chromatographic apparatus 101 via the sample inlet 101a after the sample in the vial container 4 is suctioned into the syringe 1a.

(Control of Auto-Injector)

Figure 6:
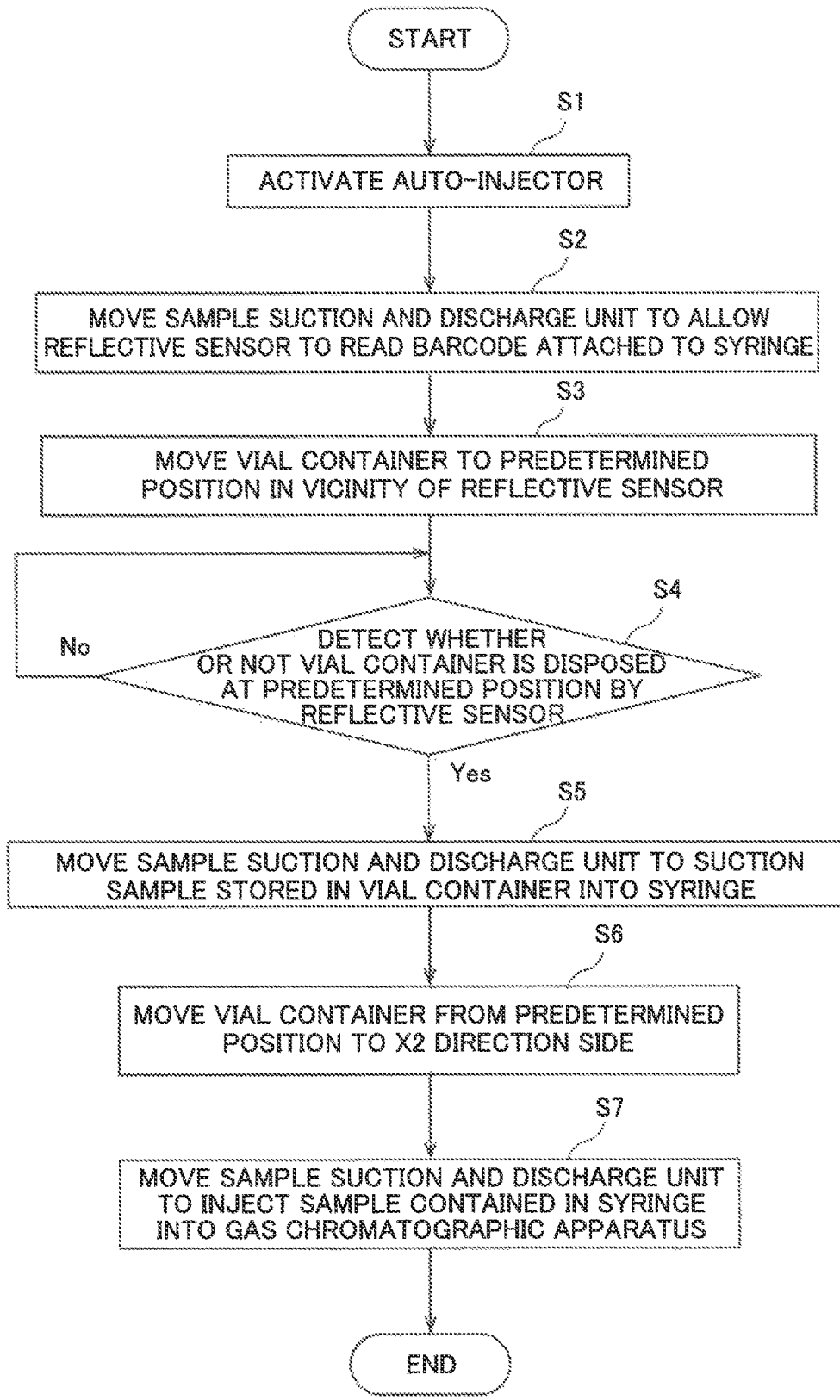
FIG. 6 is a flow chart illustrating the processing flow of the auto-injector according to the first embodiment.

A control processing flow of the auto-injector 100 is now described with reference to FIG. 6.

First, in step S1, the auto-injector 100 is activated. Next, in step S2, the sample suction and discharge unit 1 is moved by the horizontal movement mechanism 2b and the upward-downward movement mechanism 2a. Then, while the sample suction and discharge unit 1 is being moved downward by the upward-downward movement mechanism 2a, the barcode 1d attached to the syringe 1a is read by the reflective sensor 3. Consequently, the amount of movement of the plunger 1b for injecting the sample into the gas chromatographic apparatus is determined. Next, in step S3, the sample suction and discharge unit 1 is returned upward by the upward-downward movement mechanism 2a, and then the vial container 4 is moved to the predetermined position in the vicinity of the reflective sensor 3 by the vial container carrier 5.

Next, in step S4, the reflective sensor 3 detects whether or not the vial container 4 is disposed at the predetermined position. When the vial container 4 is disposed at the predetermined position, the processing advances to step S5. When the vial container 4 is not disposed at the predetermined position, the processing in step S4 is repeated. Next, in step S5, the sample suction and discharge unit 1 is moved downward toward the vial container 4 to suction the sample stored in the vial container 4 into the syringe 1a. Next, in step S6, the vial container 4 is moved from the predetermined position to the X2 direction side by the vial container carrier 5. Then, in step S7, the sample suction and discharge unit 1 is moved toward the gas chromatographic apparatus 101 to inject the sample contained in the syringe 1a into the gas chromatographic apparatus 101. At this time, the plunger 1b is moved by the amount of movement determined in step S2.

Advantages of First Embodiment

According to the first embodiment, the following advantages are obtained.

According to the first embodiment, as described above, the auto-injector 100 is configured to determine the amount of movement of the plunger 1b for injecting the sample from the syringe 1a into the gas chromatographic apparatus 101 based on the preset amount of sample to be injected into the gas chromatographic apparatus 101 and the information of the barcode 1d about the internal volume (of the syringe 1a) read by the reflective sensor 3. Accordingly, unlike the case in which the user manually sets the internal volume of the syringe 1a, the user does not make incorrect settings or forget to make settings, and thus it is possible to significantly reduce or prevent determination of the amount of movement of the plunger 1b based on the incorrectly set internal volume of the syringe 1a. Consequently, it is possible to significantly reduce or prevent a difference between the preset amount of sample to be injected into the gas chromatographic apparatus 101 and the amount of sample actually injected from the syringe 1a. Thus, it is possible to significantly reduce or prevent inadequate sample analysis by the gas chromatographic apparatus 101 due to injection of an inappropriate amount of sample.

Furthermore, the barcode 1d attached to the syringe 1a installed in the upward-downward movement mechanism 2a is read such that as compared with the case in which the barcode 1d is read and then the syringe 1a is installed in the upward-downward movement mechanism 2a, it is possible to significantly reduce or prevent an artificial mistake of installing a syringe different from the syringe 1a, the barcode 1d of which is read, in the upward-downward movement mechanism 2a.

In addition, the barcode 1d is read directly by the reflective sensor 3, and thus as compared with a radio frequency identifier (RFID) that reads information of an identification tag by radio waves, for example, it is possible to significantly reduce or prevent erroneous reading of another identification code when reading the barcode 1d. Moreover, the reflective sensor 3 is relatively small as compared with the RFID, and thus it is possible to significantly reduce or prevent an increase in the size of the device. In addition, the configuration of the auto-injector 100 can be relatively simplified as compared with the RFID.

According to the first embodiment, as described above, in the auto-injector 100, the reflective sensor 3 is configured to detect whether or not the vial container 4 that stores the sample to be suctioned into the syringe 1a is disposed at the predetermined position, and to read the barcode 1d attached to the syringe 1a. Accordingly, unlike the case in which a reflective sensor configured to detect whether or not the vial container 4 is disposed at the predetermined position and a reflective sensor configured to read the barcode 1d attached to the syringe 1a are separately provided, it is possible to significantly reduce or prevent an increase in the number of components.

Furthermore, the reflective sensor 3 has a simpler configuration as compared with a barcode reader or the like installed in a store or the like. Therefore, the configuration of the auto-injector 100 can be simplified.

According to the first embodiment, as described above, in the auto-injector 100, the reflective sensor 3 is fixed between the positions of the syringe 1a and the plunger 1b before movement by the upward-downward movement mechanism 2a and the gas chromatographic apparatus 101, as viewed in the direction perpendicular to the upward-downward direction. Accordingly, using the upward-downward movement mechanism 2a configured to move the syringe 1a and the plunger 1b in the upward-downward direction to inject the sample into the gas chromatographic apparatus 101, the barcode 1d attached to the syringe 1a being moved in the upward-downward direction by the upward-downward movement mechanism 2a can be read by the reflective sensor 3. Consequently, as compared with the case in which the syringe 1a is moved by a dedicated movement mechanism different from the upward-downward movement mechanism 2a in order for the reflective sensor 3 to read the barcode 1d, an increase in the number of components can be significantly reduced or prevented while the device configuration can be simplified.

According to the first embodiment, as described above, in the auto-injector 100, the barcode 1d further includes the information about the tip shape of the needle 1c attached to the syringe 1a. Accordingly, unlike the case in which the information about the needle tip shape is manually set, it is possible to significantly reduce or prevent incorrect setting of the information about the needle tip shape.

Second Embodiment

The configuration of an auto-injector 200 according to a second embodiment is now described with reference to FIGS. 7 to 10. In the auto-injector 200 according to the second embodiment, a barcode 14a is attached to a vial container 14 unlike in the auto-injector 100 according to the aforementioned first embodiment. In the second embodiment, the same configurations as those of the aforementioned first embodiment are denoted by the same reference numerals, and description thereof is omitted.

(Configuration of Auto-Injector)

Figure 7:
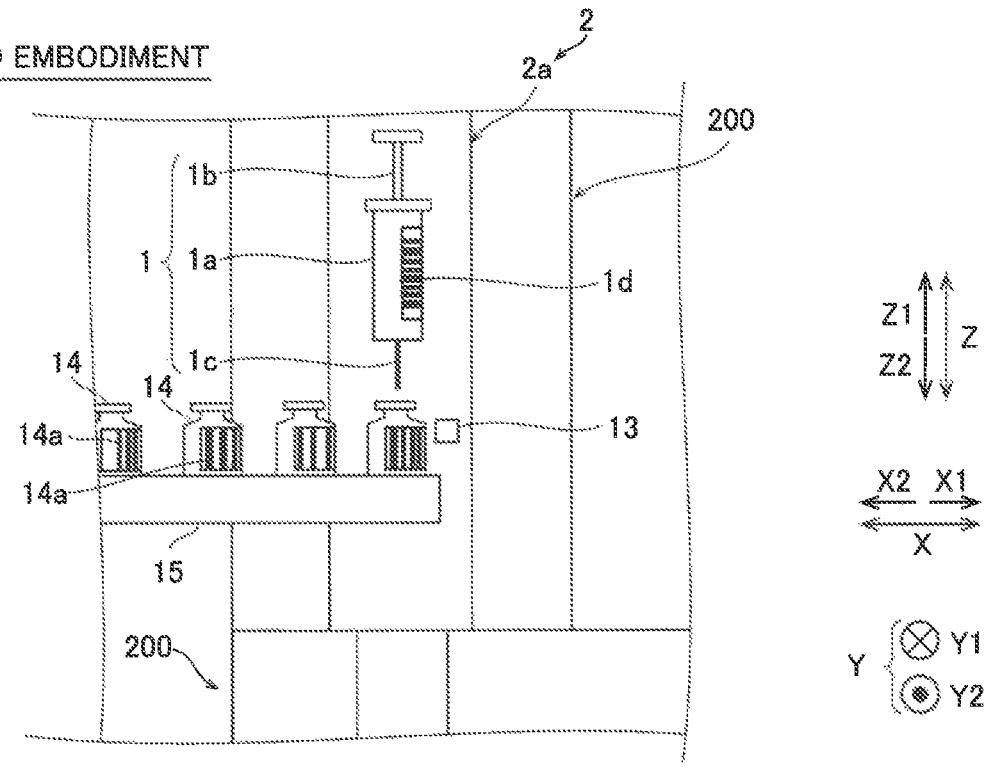
FIG. 7 is a diagram illustrating a state in which a vial container has been moved to a predetermined position in the vicinity of a reflective sensor according to a second embodiment.

As shown in FIG. 7, the auto-injector 200 includes a reflective sensor 13. Furthermore, the auto-injector 200 includes a vial container carrier 15. In the vial container carrier 15, the vial container 14 to which the barcode 14a is attached is disposed. The reflective sensor 13 and the vial container carrier 15 are examples of an "optical sensor" and a "vial container movement mechanism" in the claims, respectively. The auto-injector 200 and the barcode 14a are examples of a "sample injector" and a "second identification code" in the claims, respectively.

The barcode 14a indicates information about at least the type of sample stored in the vial container 14. That is, the barcode 14a has a different shape for each type of sample stored in the vial container 14 to which the barcode 14a is attached. The barcode 14a may have information (information such as the concentration) other than the type of sample stored in the vial container 14.

In the second embodiment, the reflective sensor 13 is configured to read the barcode 14a when the vial container 14 is disposed at a predetermined position in addition to reading the barcode 1d and detecting whether or not the vial container 14 is disposed at the predetermined position. Specifically, the reflective sensor 13 is configured to read the barcode 14a when detecting that the vial container 14 is disposed at the predetermined position.

That is, the reflective sensor 13 is configured to read the barcode 1d when a syringe 1a is moved to the vicinity of the reflective sensor 13 by an upward-downward movement mechanism 2a, and to read the barcode 14a when the vial container 14 is moved to the predetermined position in the vicinity of the reflective sensor 13 by the vial container carrier 15. In this case, the vial container 14 is configured to rotate in the vial container carrier 15 such that the entire surface of the barcode 14a of the vial container 14 can be read by the reflective sensor 13. Specifically, the vial container 14 has a substantially cylindrical shape, and is configured to rotate about a central axis (not shown) of the substantially cylindrical vial container 14.

Figure 8:
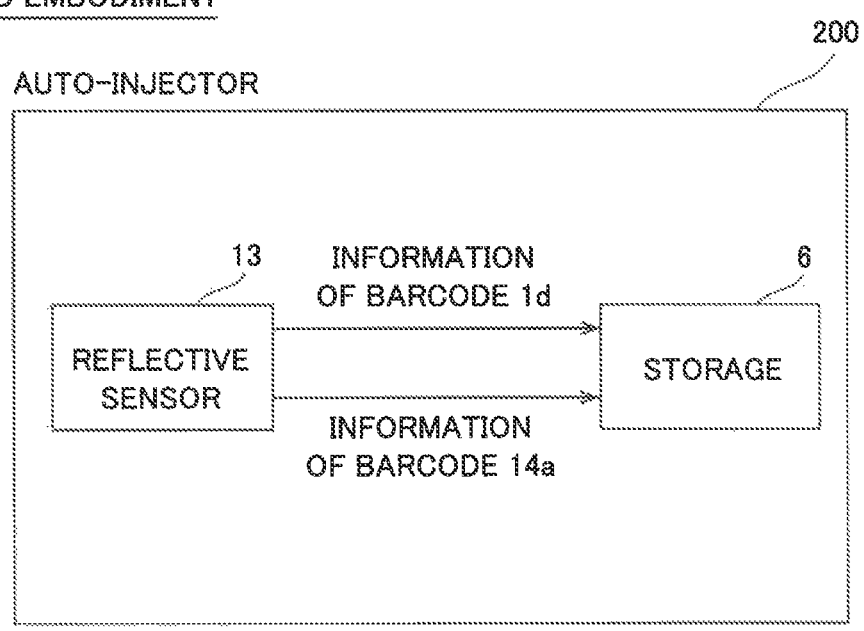
FIG. 8 is a diagram illustrating a storage of an auto-injector according to the second embodiment.

In the second embodiment, as shown in FIG. 8, the auto-injector 200 includes a storage 6 that stores information about the sample of the vial container 14 suctioned into the syringe 1a and information about the syringe 1a in association with each other based on the barcode 1d and the barcode 14a read by the reflective sensor 13. Specifically, the storage 6 stores, in advance, information (see FIG. 9) about the internal volume and the model name of each of a plurality of types of syringes 1a.

Then, the auto-injector 200 stores, in the storage 6, information (see FIG. 10) obtained by associating samples (samples A, B, C, . . . , and X, for example) injected into a gas chromatographic apparatus 101 with the types of syringes 1a (syringes A, B, C, . . . , and F, for example) used for injection based on the barcode 1d and the barcode 14a.

For example, information that the sample A is injected by the syringe A and the sample B is injected by the syringe B is stored in the storage 6. Thus, information indicating that the sample A is injected by the syringe 1a having an internal volume of 50 µl as a syringe model name AAAA and the sample B is injected by the syringe 1a having an internal volume of 10 µl as a syringe model name BBBB is stored in the storage 6.

The remaining configurations of the second embodiment are similar to those of the aforementioned first embodiment.

Advantages of Second Embodiment

According to the second embodiment, the following advantages are obtained.

According to the second embodiment, as described above, in the auto-injector 200, the reflective sensor 13 is configured to read the barcode 14a attached to the vial container 14 when the vial container 14 is disposed at the predetermined position in addition to reading the barcode 1d and detecting whether or not the vial container 14 is disposed at the predetermined position. Accordingly, unlike the case in which the type of sample stored in the vial container 14 is manually set, it is possible to significantly reduce or prevent incorrect setting of the type of sample. Consequently, it is possible to further significantly reduce or prevent inadequate sample analysis by the gas chromatographic apparatus 101.

According to the second embodiment, as described above, the auto-injector 200 includes the storage 6 configured to store the information about the sample of the vial container 14 suctioned into the syringe 1a and the information about the syringe 1a in association with each other based on the barcode 1d and the barcode 14a read by the reflective sensor 13. Accordingly, as compared with the case in which the amount and type of sample to be injected into the gas chromatographic apparatus 101 are manually associated with each other and stored, it is possible to significantly reduce or prevent storing of the amount and type of sample incorrectly associated with each other. Furthermore, the information about the sample of the vial container 14 and the information about the syringe 1a are stored in association with each other such that it is possible to more easily trace (analyze) the results of analysis of the gas chromatographic apparatus 101.

According to the second embodiment, as described above, in the auto-injector 200, the reflective sensor 13 is fixed in the vicinity of the predetermined position, and is configured to read the barcode 1d when the syringe 1a is moved to the vicinity of the reflective sensor 13 by the upward-downward movement mechanism 2a, and to read the barcode 14a when the vial container 14 is moved to the predetermined position in the vicinity of the reflective sensor 13 by the vial container carrier 15. Accordingly, the barcode 1d and the barcode 14a can be read by the reflective sensor 13 without moving the reflective sensor 13 to read the barcode 1d and the barcode 14a.

The remaining advantages of the second embodiment are similar to those of the aforementioned first embodiment.

MODIFIED EXAMPLES

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the auto-injector 100 (200) includes the reflective sensor 3 (13) in each of the aforementioned first and second embodiments, the present invention is not limited to this. For example, the auto-injector 100 (200) may alternatively include a barcode reader.

While the sample suction and discharge unit 1 is configured to be movable in the horizontal direction in each of the aforementioned first and second embodiments, the present invention is not limited to this. For example, the sample suction and discharge unit 1 may alternatively be configured to be movable only in the upward-downward direction.

While the barcode 1d (first identification code) includes the information about the internal volume of the syringe 1a and the tip shape of the needle 1c in each of the aforementioned first and second embodiments, the present invention is not limited to this. For example, the barcode 1d (first identification code) may alternatively include information about a material (such as a coating material) of the plunger 1b.

While the type of sample and the type of syringe 1a are stored in association with each other in the aforementioned second embodiment, the present invention is not limited to this. For example, the type of sample and the number of uses of the syringe 1a in addition to the type of syringe 1a may alternatively be stored in association with each other.

While the barcode 1d is read immediately after the auto-injector 100 (200) is activated in each of the aforementioned first and second embodiments, the present invention is not limited to this. For example, the barcode 1d may alternatively be read each time the syringe 1a is replaced.

While it is determined whether or not the vial container is disposed at the predetermined position after the barcode 1d is read in each of the aforementioned first and second embodiments, the present invention is not limited to this. For example, the barcode 1d may alternatively be read after it is determined whether or not the vial container is disposed at the predetermined position and the sample is suctioned into the syringe 1a.

While the barcode 1d (first identification code) is attached to the syringe 1a in each of the aforementioned first and second embodiments, the present invention is not limited to this. For example, an identification code different from the barcode may alternatively be attached to the syringe 1a. Furthermore, in the aforementioned second embodiment, an identification code different from the barcode may alternatively be attached to the vial container 14.

While the processing of the auto-injector 100 (200) is described using a flowchart in a "flow-driven manner" for the convenience of illustration in each of the aforementioned first and second embodiments, the present invention is not limited to this. The processing of the auto-injector 100 (200) may alternatively be performed in an "event-driven manner" in which the processing is performed on an event basis. In this case, the processing may be performed in a complete event-driven manner or in a combination of an event-driven manner and a flow-driven manner.

What is claimed is:

1. A sample injector comprising:
   a syringe movement mechanism configured to move a syringe that contains a sample, the syringe being attached with a first identification code that indicates information about its own internal volume, and a piston that reciprocates within the syringe toward an analyzer configured to analyze the sample; and
   an optical sensor configured to read the first identification code attached to the syringe installed in the syringe movement mechanism,
   the sample injector being configured to determine an amount of movement of the piston for injecting the sample from the syringe into the analyzer based on a preset amount of the sample to be injected into the analyzer and the information of the first identification code about the internal volume read by the optical sensor.

2. The sample injector according to claim 1, wherein the optical sensor is configured to detect whether or not a vial container that stores the sample to be suctioned into the syringe is disposed at a predetermined position, and to read the first identification code attached to the syringe.

3. The sample injector according to claim 2, wherein the optical sensor includes a reflective sensor configured to read the first identification code, and to detect whether or not the vial container is disposed at the predetermined position.

4. The sample injector according to claim 2, wherein the optical sensor is configured to read a second identification code attached to the vial container, the second identification code indicating information about at least a type of the sample stored in the vial container, when the vial container is disposed at the predetermined position, in addition to reading the first identification code and detecting whether or not the vial container is disposed at the predetermined position.

5. The sample injector according to claim 4, further comprising a storage configured to store information about the sample of the vial container suctioned into the syringe and information about the syringe in association with each other based on the first identification code and the second identification code read by the optical sensor.

6. The sample injector according to claim 4, further comprising a vial container movement mechanism configured to horizontally move the vial container; wherein
 the optical sensor is fixed in a vicinity of the predetermined position, and is configured to read the first identification code when the syringe is moved to a vicinity of the optical sensor by the syringe movement mechanism, and to read the second identification code when the vial container is moved to the predetermined position in the vicinity of the optical sensor by the vial container movement mechanism.

7. The sample injector according to claim 1, wherein
 the syringe movement mechanism includes an upward-downward movement mechanism configured to move the syringe and the piston in an upward-downward direction to inject the sample contained in the syringe into the analyzer; and
 the optical sensor is fixed between positions of the syringe and the piston before movement by the upward-downward movement mechanism and the analyzer, as viewed in a direction perpendicular to the upward-downward direction.

8. The sample injector according to claim 1, wherein the first identification code further includes information about a tip shape of a needle attached to the syringe.

\* \* \* \* \*